DATA LINE SWITCHING SYSTEM HAVING CAMP ON BUSY LINE MEANS

Filed Aug. 4, 1964 8 Sheets-Sheet 1

ORIGINATING REGISTER O

INVENTORS R. M. GREEN
J. A. HOFFMAN
BY
ATTORNEY

Sept. 26, 1967 R. M. GREEN ET AL 3,344,235

DATA LINE SWITCHING SYSTEM HAVING CAMP ON BUSY LINE MEANS

Filed Aug. 4, 1964 8 Sheets-Sheet 2

FIG. 2 ORIGINATING REGISTER O

DATA LINE SWITCHING SYSTEM HAVING CAMP ON BUSY LINE MEANS

FIG. 3 ORIGINATING REGISTER O DIGIT REGISTRATION

Sept. 26, 1967 R. M. GREEN ET AL 3,344,235

DATA LINE SWITCHING SYSTEM HAVING CAMP ON BUSY LINE MEANS

Filed Aug. 4, 1964 8 Sheets-Sheet 4

FIG. 4 ORIGINATING REGISTER O

Sept. 26, 1967 R. M. GREEN ET AL 3,344,235

DATA LINE SWITCHING SYSTEM HAVING CAMP ON BUSY LINE MEANS

Filed Aug. 4, 1964 8 Sheets-Sheet 5

Sept. 26, 1967 R. M. GREEN ET AL 3,344,235

DATA LINE SWITCHING SYSTEM HAVING CAMP ON BUSY LINE MEANS

Filed Aug. 4, 1964 8 Sheets-Sheet 6

INTERCEPT TRUNK CCT.

United States Patent Office 3,344,235
Patented Sept. 26, 1967

3,344,235
DATA LINE SWITCHING SYSTEM HAVING CAMP ON BUSY LINE MEANS

Ronald M. Green, San Pedro, and Jerome A. Hoffman, La Crescenta, Calif., assignors to American Telephone and Telegraph Company, New York, N.Y., a corporation of New York Filed Aug. 4, 1964, Ser. No. 387,331
9 Claims. (Cl. 179—18)

Figure 1:
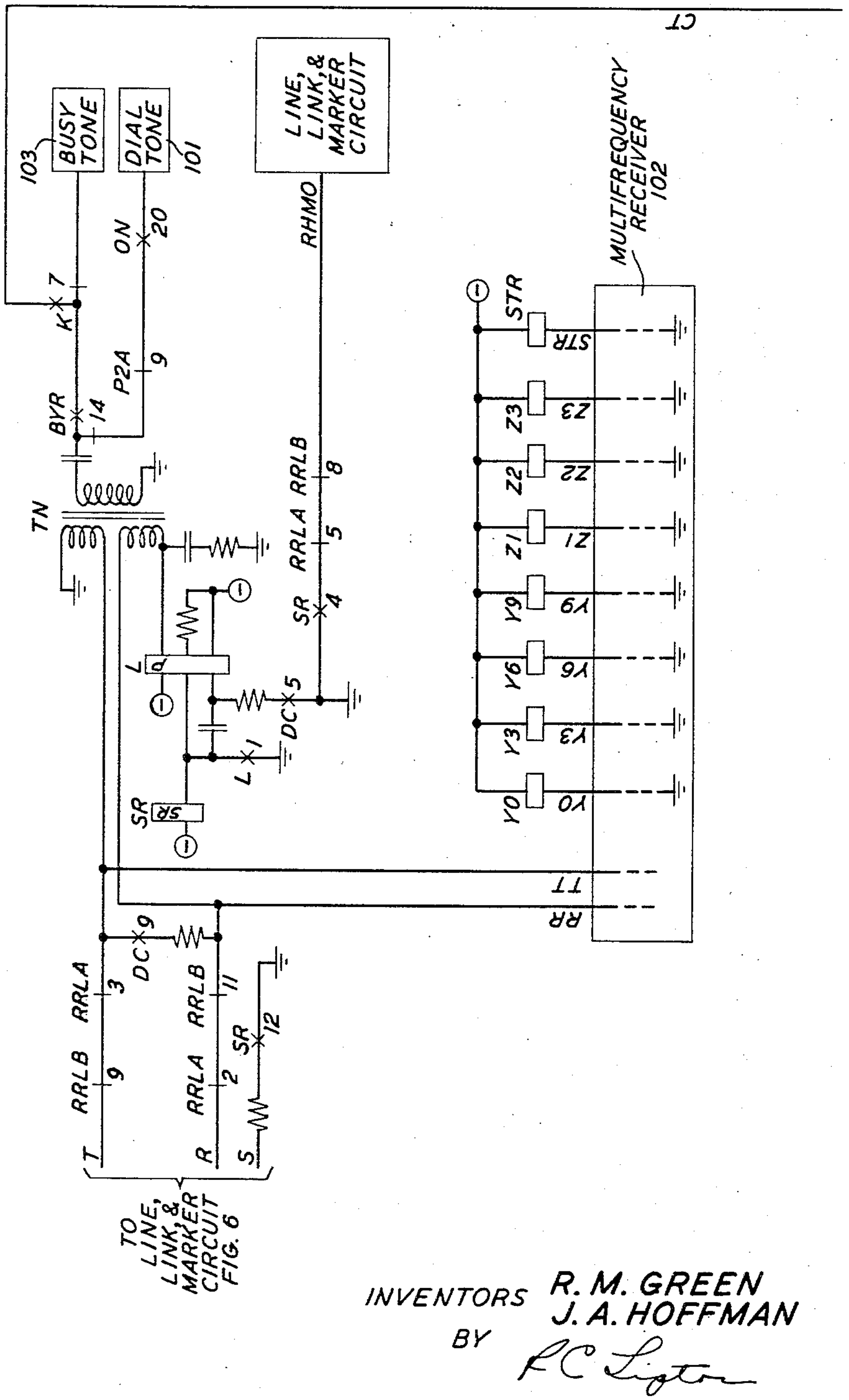

This invention relates to a switching office for interconnecting data subscriber lines and, more particularly, to switching office control circuits for processing data messages when the called subscriber is busy.

A broad object of this invention is to provide an improved switching office control circuit for processing messages when called subscribers are busy.

In Patent 3,113,176, which issued to T. L. Doktor et al. on Dec. 3, 1963, there is disclosed a subscriber data set arranged to communicate via a line switching system. Specifically, the subscriber set is connected to the telephone switching network and includes means for sending digits to effect a connection by way of a central telephone office. When the call is completed, the called subscriber returns an answering signal enabling the originating subscriber to initiate data transmission over the telephone line facilities. In accordance with the specific embodiment of the present invention disclosed herein, the subscriber set is connected to a line switching system known as a PBX (private branch exchange), an arrangement disclosed, for example, in Patent 2,949,506 which issued to H. H. Abbott et al. on Aug. 16, 1960.

As disclosed in the H. H. Abbott et al. patent, when the subscriber initiates a call to another PBX subscriber, an originating register is obtained to store the address digits of the called subscriber. When the address storage is completed, the register requests the services of the marker and the address digits are passed thereto. The marker then interconnects the calling and called subscribers or, if the called subscriber is busy, the marker connects the calling subscriber to the busy tone trunk and the tone is returned to the calling subscriber. In the event, however, that the busy tone trunk is busy, the marker restores control of the connection to the register which supplies its own busy tone to the calling subscriber. If the call is originated by an incoming trunk and the called line is busy, a supplemental connection may be prepared, which connection may later be cut through from the called line. Accordingly, the trunk will camp on the line and automatically cut through when the called subscriber becomes idle.

In general, data messages have relatively short durations. Accordingly, if the called line is busy, it is preferable to enable the calling subscriber to cut through when the called station becomes idle unless there is a prolonged or permanent busy condition.

Accordingly, it is an object of this invention to connect a calling subscriber to a called subscriber when the called subscriber becomes idle unless there is a prolonged busy condition.

It is another object of this invention to intercept calls if the called line has a prolonged busy condition.

In accordance with the specific embodiment of the invention disclosed herein, the PBX is modified by converting the busy tone trunk to an intercept trunk terminated by a data set and applying a simulated busy condition to the trunk under the control of the register. Accordingly, when the called line is busy, with the trunk busy, the marker restores control of the connection to the register. In addition, the register is arranged, upon regaining control, to reseize the marker, whereby repeated attempts are made to complete the connection to the called station, thereby providing a camp-on arrangement under the control of the register.

It is a further feature of this invention to remove the busy condition applied to the intercept trunk in the event that the called station does not become idle within a predetermined interval of time. This permits the marker to connect the trunk to the calling subscriber whereby the data message is intercepted.

It is another feature of this invention to arrange the register to signal the calling subscriber when a camp-on condition exists.

It is an additional feature of this invention to preclude marker reseizure when other registers are in the camp-on condition.

Figure 5:
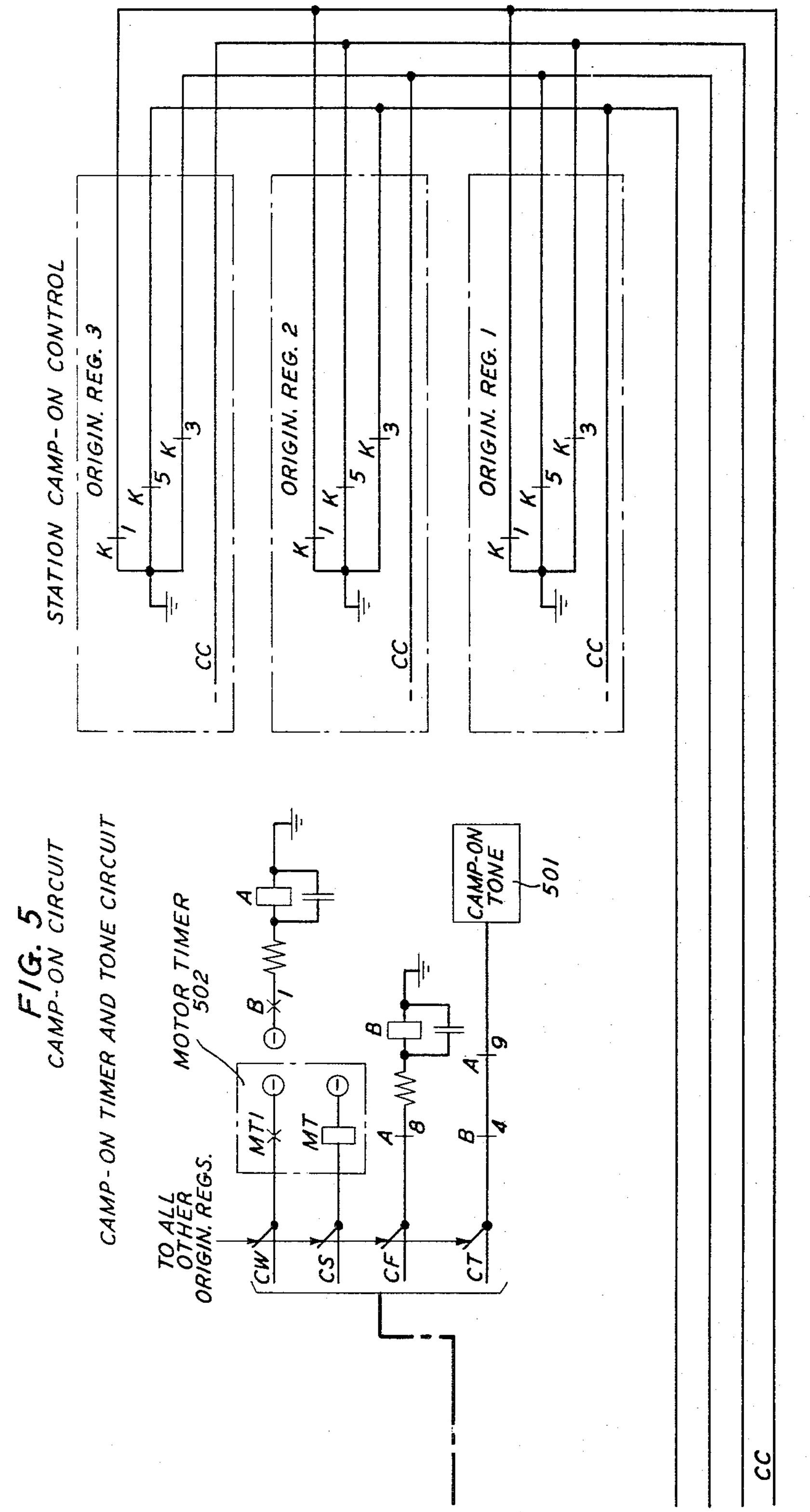
Figure 6:
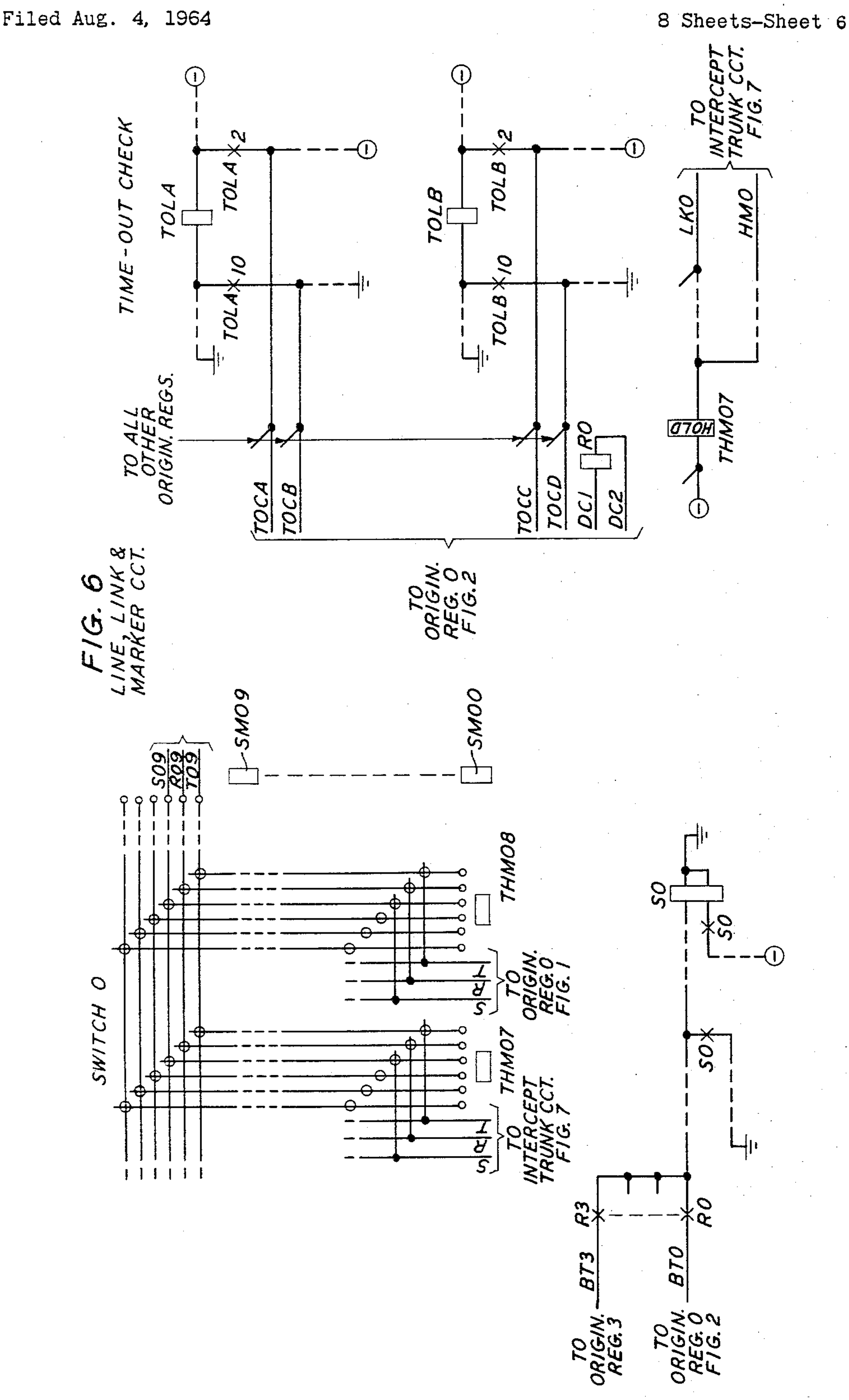
Figures 7, 8:
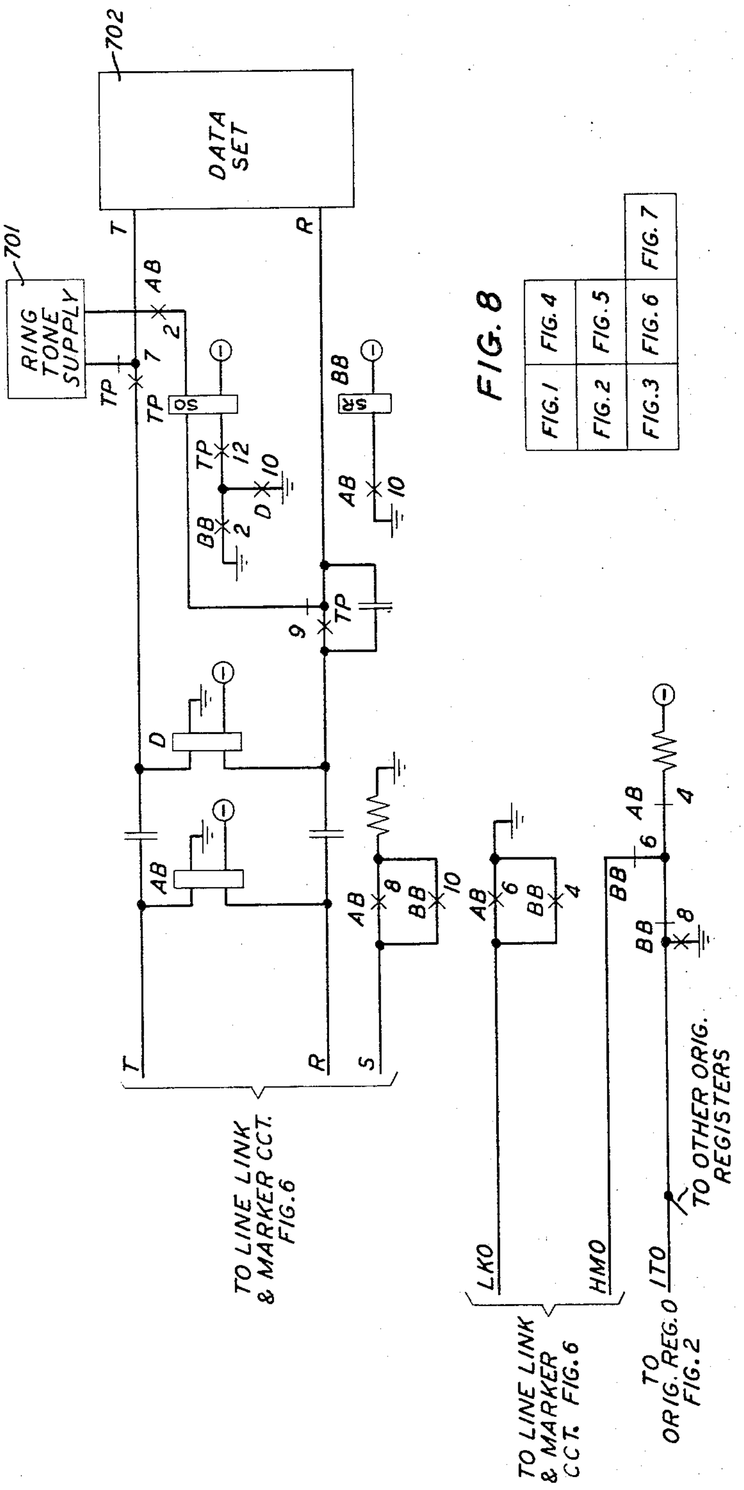
Figure 9:
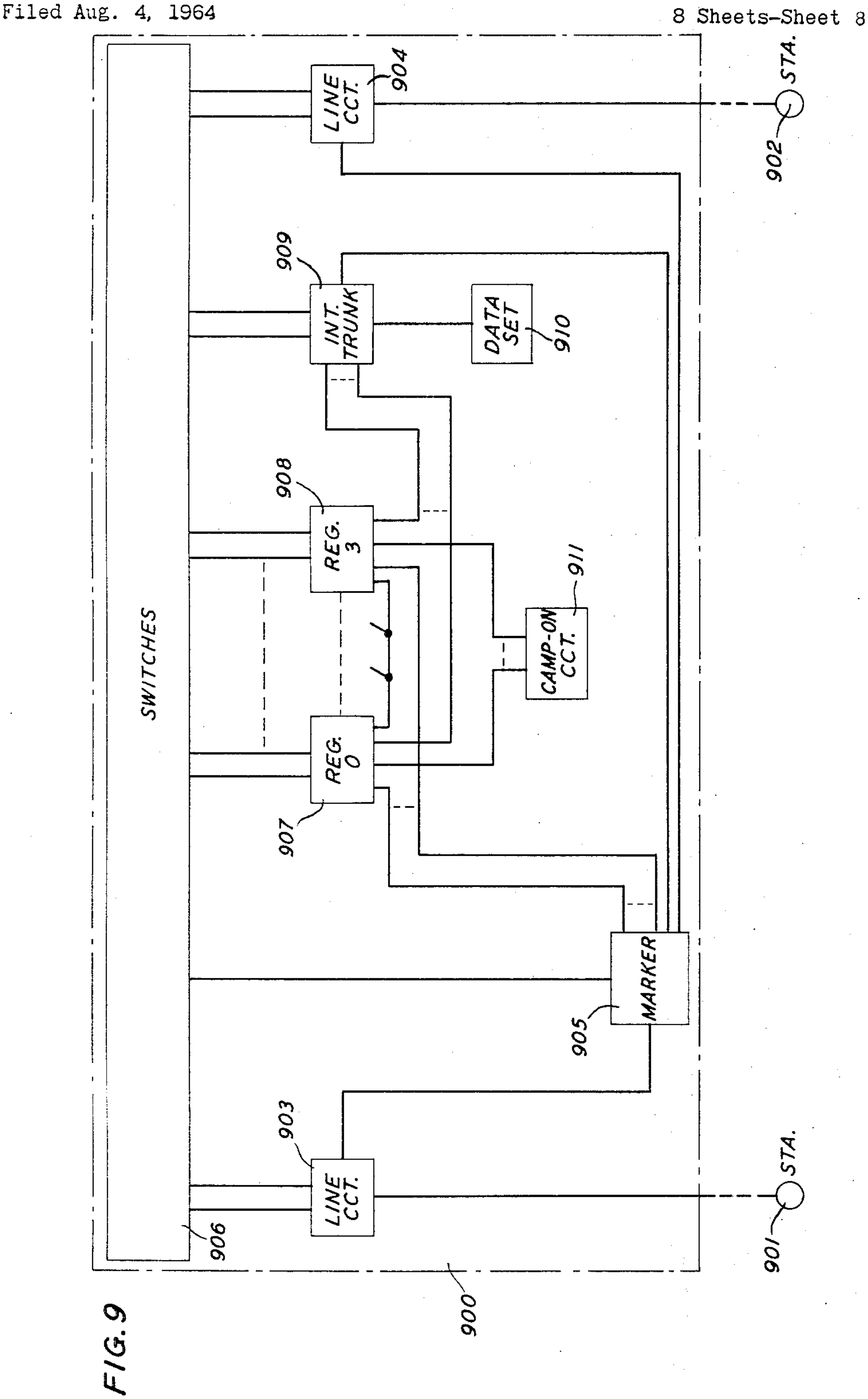

The foregoing and other objects and features of this invention will be fully understood from the following description of an illustrative embodiment thereof taken in conjunction with the accompanying drawing wherein:

FIGS. 1 through 7, when arranged as shown in FIG. 8, show the details of circuits and equipment which cooperate to form a camp-on and intercept circuit for a PBX in accordance with the invention; and FIG. 9 illustrates, in block form, the various equipment and circuits of the PBX and the manner in which it cooperates with the camp-on and intercept circuit.

In the several figures of the drawing, the relay contacts are shown detached from the relay winding. Contacts which are closed when the associated relays are deenergized, known as "break contacts" are represented by a single short line perpendicular to the conductor line, while contacts which are closed when the relay is energized, known as "make contacts" are represented by two short cross lines diagonally intersecting the conductor line.

*General description*

Referring now to FIG 9, a private branch exchange is generally indicated by block 900. Connected to PBX 900 are subscriber stations of which stations 901 and 902 are disclosed. Stations 901 and 902, which may be substantially identical, are connected to line circuits 903 and 904, respectively, in PBX 900.

PBX 900 also includes crossbar wsitches, generally indicated by block 906, common control marker 905, intercept trunk 909, which is terminated by data set 910, and a plurality of substantially identical originating registers of which registers 907 and 908 are shown. It is noted that registers 907 and 908 are connected to intercept trunk 909 to normally apply a simulated busy condition thereto.

Subscriber station 901 is capable of transmitting and receiving data messages and is arranged in substantially the same manner as the subscriber set disclosed in the above-identified T. L. Doktor et al. patent. It is noted in the T. L. Doktor et al. patent that the subscriber data set includes means for transmitting or dialing the digits of the desired called station. In accordance with the present embodiment, this dialing means may constitute any well known multifrequency dialing set which transmits a multifrequency tone for each digit.

Assuming, now, that station 901 initiates a call by presenting an off-hook signal to line circuit 903, line circuit 903 proceeds to seize marker 905. As disclosed in detail in the above-identified H. H. Abbott et al. patent, marker 905, in response to the seizure, attaches an idle register such as register 907 to line circuit 903 by way of switch 906 and marker 905 then releases.

With register 907 connected to line circuit 903, the register returns dial tone therethrough to station 901. The subscriber, upon receipt of the dial tone, then proceeds to transmit the digits of the addressee station. These digits are received by register 907 and are registered therein.

After all the digits are registered, register 907 requests the services of the marker and sends the digits thereto. Assuming that the called station is idle, the marker connects station 901 with the called station by way of switch 906 and signals register 907 to release from the connection. Accordingly, register 907 releases and removes the digit registration. The subscriber at station 901 is now able to communicate with the addressee station.

In the event that the called line is busy, marker 905 attempts to connect calling station 901 to intercept trunk 909 by first testing to see if the trunk is busy. Since register 907 normally applies a busy condition to intercept trunk 909, marker 905 finds trunk 909 busy and therefore returns a trunk busy signal to register 907.

Register 907, in response to the trunk busy signal, permits marker 905 to release and goes into the camp-on condition. It is noted that register 907 must initially scan the other registers to determine if all the other registers are presently in the camp-on condition. In the event that all the other registers are in the camp-on condition, register 907 returns a busy signal to station 901 to advise the subscriber of the busy condition and to release from the connection. Assuming, however, that at least one other register is not in the camp-on condition, register 907 returns a camp-on signal to subscriber station 901, initiates the operation of a camp-on timer, which timer may have an interval of, for example, 3 minutes, and enables a register timer which may have an interval of, for example, 7 seconds.

Upon the termination of the 7-second register timer interval, register 907 again requests the services of marker 905 and applies the digits of the called station thereto. If the called line is idle, the marker proceeds to connect station 901 to the called station, as previously described, register 907 is released from the connection and the camp-on condition is removed. In the event, however, that the called line is busy, marker 905 again tests trunk 909, and finding it busy returns control of the connection to register 907. Accordingly, after each 7-second interval, the services of marker 905 are requested and the condition of the called line is tested.

Assuming that the called line remains busy for an interval of 3 minutes, the camp-on timer times out and register 907 removes the simulated busy condition from trunk 909. Accordingly, when the services of marker 905 are again requested, and if the called line is still busy, marker 905 finds trunk 909 in the idle condition and thereupon connects trunk 909 to subscriber station 901 by way of switch 906 and line circuit 903. With this connection complete, data set 910 is enabled to return an answering signal enabling subscriber 901 to initiate data transmission. Accordingly, the message is intercepted by data set 910.

*Storing address digits in originating register*

When a PBX station goes off-hook to initiate a call the line relay associated with the calling PBX operates to effect a seizure of the marker circuit. Assuming an originating register is available, the marker proceeds to connect the calling station line to the originating register and release.

As disclosed in the above-identified H. H. Abbott et al. patent, a calling party associated with line circuit 30, for example, shown in FIG. 35 of the patent, is connected by the marker to horizontal level conductors S09, R09 and T09 which extend to switch 0 shown in FIG. 3 of the patent. With dial pulse register 0 shown in FIGS. 14, 18 and 19 of the patent available, the marker proceeds to operate select magnets SM09 and SM00 and hold magnet THM08, extending leads S09, R09 and T09 to dial pulse register 0 leads S, R and T shown in FIG. 18 of the patent. Referring now to FIG. 6, similarly identified horizontal conductor leads S09, R09 and T09 are disclosed extending to switch 0 and thence, with select magnets SM09 and SM00 and hold magnet THM08 operated, to leads S, R and T which are connected to the originating register 0 in FIG. 1.

The connection of the calling subscriber, in the off-hook condition, to originating register 0, completes a D.-C. path from ground through a primary winding of repeater coil TN, break contact RRLA–3, break contact RRLB–9, the tip conductor, the line link and marker circuit and the calling subscriber line circuit to the ring lead and thence through break contacts RRLA–2 and RRLB–11, the other primary winding of repeater coil TN and a winding of line relay L to negative battery. Relay L, accordingly, operates its make contact to extend ground to the winding of relay SR. The operation of relay SR extends ground through make contact SR–4 and break contacts RRLA–5 and RRLB–8 to conductor RHM0. As disclosed in FIG. 18 of the above-identified H. H. Abbott et al. patent, ground on conductor RHM0 holds magnet THM08 operated to maintain the connection to the calling subscriber.

Relay SR operated extends ground through make contact SR–12 to sleeve lead S, rendering the line circuit of the calling subscriber busy to other calls. In addition, relay SR operated completes an obvious operating path for relay ON, FIG. 2, by way of make contact SR–8.

The operation of relay ON removes ground applied to conductor ONG0 by way of break contact ON–6 and removes negative battery applied to conductor ONB0 by way of break contact ON–8. As disclosed in FIG. 14 of the Abbott et al. patent, opening conductors ONB0 and ONG0 signal the marker that the dial pulse register is unavailable. Relay ON operated also completes an operating path for hundredths digit relay HD in the digit steering circuit, FIG. 4, through the break contact of contacts P2A–4 and make contact ON–3 and relay HD locks through its own make contact, the break contact of contacts TD–14, UD–14 and DC–1 and make contact ON–1 to ground. In addition, relay ON operated, applies the output of dial tone source 101, FIG. 1, through make contact ON–20, break contact P2A–9, the break contact of contacts BYR–14 and thence across the secondary winding of repeater coil TN. Accordingly, dial tone is returned to the calling subscriber.

In response to the dial tone, the calling subscriber proceeds to send the multifrequency tones designating the digits of the called station. The multifrequency signals are received by the line circuit of originating register 0 and applied by way of leads RR and TT to a multifrequency receiver, generally indicated by block 102, which receiver may be of the type disclosed in Patent 2,237,742 issued to A. A. Lundstrom on Apr. 8, 1941. The multifrequency receiver, in response to each digit, extends ground to one conductor in a first group shown as conductors Y0, Y3, Y6 and Y9, one conductor in a second group shown as conductors Z1, Z2 and Z3 and a third conductor STR, which conductors extend to correspondingly identified relays. The operation of relay STR, in response to the first digit together with the operation of relay Y0, Y3, Y6 or Y9 and relay Z1, Z2 or Z3 extends the winding of relay P2A, FIG. 4, to make contact ON–2 and thence to ground whereby relay P2A operates and locks through its own make contact and make contact ON–2. It is noted that relay P2A is not operated in the event that relays Z1 and Y0 are operated, which combination corresponds to the digit 1. This conforms with standard D.-C. pulse registers which preclude a digit registration in response to a line hit.

Figure 3:
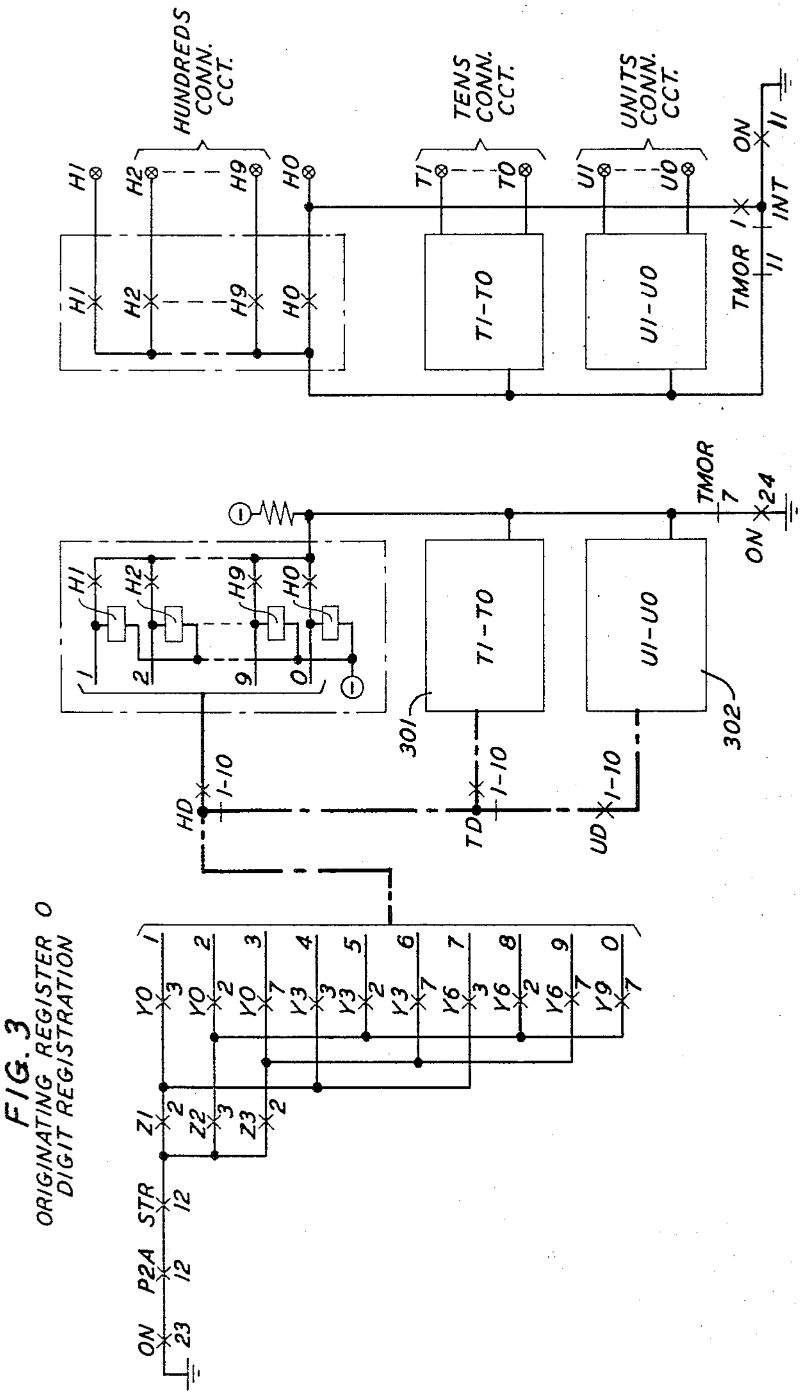

With relays P2A and STR operated, the first digit is registered in one of the hundredths digits register relays H0 through H9, FIG. 3. For example, assuming that the hundredths digit 2 is received operating relays Z2 and Y0, the path is completed from ground through the make contacts of relay ON, relay P2A, relay STR, relay Z2 and relay Y0 and then through make contacts of relay HD to the winding of relay H2 operating relay H2 which locks through its own make contact, break contact TMOR–7 and make contact ON–24 to ground. The operation of relay H2 extends ground through make contact ON–11, the break contact of contacts INT–1, break contact TMOR–11 and the make contact of relay H2 to terminal stamping H2. Terminal stamping H2, in turn, is extendable to the hundredths connector circuit in the marker, which connector circuit is substantially identical to the tens connector circuit shown in FIG. 12 of Patent 2,949,-506. Accordingly, the hundredths digit registration will be passed to the marker upon its reseizure by the dial pulse register, as described hereinafter.

Figure 4:
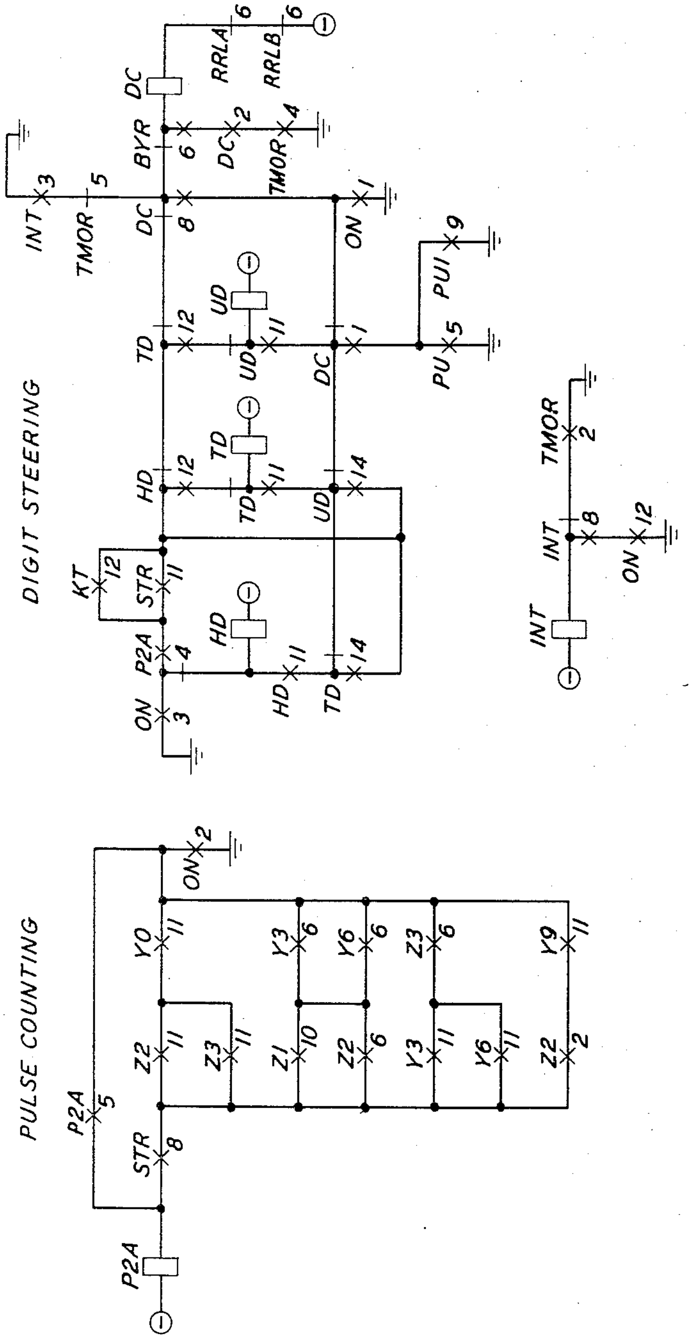

The operation of relays P2A and STR also completes an operating path for tens digit relay TD, FIG. 4, which path may be traced through make contact ON–3, the make contact of contacts P2A–4, make contact STR–11, the make contact of contacts HD–12 and the break contact of contacts TD–11, operating relay TD which locks by way of its own make contact, the break contact of contacts UD–14, the break contact of contacts DC–1, and make contact ON–1. Relay TD operated transfers the locking path of relay HD through the make contact of contacts TD–14 and the make contacts of relays STR, P2A and ON. Accordingly, the subsequent termination of the reception of the first multifrequency digit releases relay STR and the operated ones of the digit relays associated with the multifrequency receiver opening the locking path of relay HD, whereupon the relay releases.

The reception of the second multifrequency tone digit by multifrequency receiver 102 again reoperates relay STR and the appropriate one of relays Y0, Y3, Y6 or Y9 and relays Z1, Z2 or Z3. With relay STR reoperated, ground is extended to the winding of the units digit relay UD, FIG. 4, by way of make contact ON–3, the make contact of contacts P2A–4, make contact STR–11, the break contact of contacts HD–12, the make contact of contacts TD–12 and the break contact of contacts UD–11 operating relay UD which locks by way of its own make contact, the break contact of contacts DC–1 and make contact ON–1. In addition, the reoperation of relay STR registers the second digit in one of the tens digit register relays T0 through T9 which relays are generally indicated by block 301, FIG. 3, and are arranged in the same manner as the hundredths digit register relays H0 through H9. Assume, for example, that the tens digit 2 is received, operating relays Z2 and Y0, the path is completed from ground through the make contacts of relay ON, relay P2A, relay STR, relay Z2 and relay Y0 and then through the break contact of relay HD and the make contact of relay TD to the winding of the T relay which corresponds to relay H2, the T relay then locking through its own make contact, break contact TMOR–7, and make contact ON–24 to ground. The operation of the T relay then extends ground through make contact ON–11, the break contact of contacts INT–1, break contact TMOR–11 and the make contact of the T relay to the corresponding terminal stamping which, in turn, is extendable to the tens connector circuit in the marker. Thus, the tens digit registration will be passed to the marker on its reseizure by the dial pulse register.

With relay UD operated, as previously described, the locking path of relay TD is transferred through the make contact of contacts UD–14 to make contact STR–11. Accordingly, the subsequent termination of the reception of the second multifrequency digit releases relay STR opening the locking path of relay TD, whereupon the relay releases.

When the units digit is received, the reoperation of relay STR operates one of relays U0 through U9, generally indicated by block 302, in the digit registration circuit, FIG. 3, corresponding to the units digit since the path is now completed through the break contacts of relays HD and TD and the make contact of relay UD. Accordingly, the digit registration is now provided to one of terminal stampings U0 through U9.

With relay STR operated and relays HD and TD released, an operating path is now completed for relay DC, FIG. 4, through make contact ON–3, the make contact of contacts P2A–4, make contact STR–11, the break contact of contacts HD–12, TD–12, DC–3 and BYR–6, the winding of relay DC and break contacts RRLA–6 and RRLB–6, whereby relay DC operates and locks by way of its own make contact and make contact ON–1. The operation of relay DC opens the previously-described locking path for relay UD and the latter relay releases. In addition, relay DC operated extends negative battery to conductor DC2 by way of make contact DC–12, FIG. 2, and extends ground through conductor DC–1 by way of make contact DC–11. This prepares an operating path for the R0 relay in the marker circuit, FIG. 6, which, as described in the Abbott et al. patent, indicates that the dial pulse register is calling upon the services of the marker. In addition, relay DC operated completes a circuit for maintaining energized the lower winding of relay L, as viewed in FIG. 1, and prepares a low impedance path across the tip and ring lead to insure that relay L remains operated at the end of the dialing of the units digit. Thereafter, at the termination of the reception of the digit, relay STR releases together with the release of the operated ones of the digits relays associated with the multifrequency receiver.

Assuming that the marker is available, the registered digits are passed thereto, as described in the Abbott et al. patent. The marker effects the connection of the calling line to the called line if the called line is not busy, and upon determining that the connection is completed, signals the originating register to release from the connection. This signal comprises ground pulses on conductors RRA0 and RRB0, FIG. 2. The ground pulse on conductor RRA0 is extended by way of break contact BYR–12, and make contact ON–15 to the winding of relay RRLA which locks through its own make contact and the ON relay make contact. Similarly, the ground pulse on conductor RRB0 is passed through break contact BYR–11 and make contact ON–16 to the winding of relay RRLB which locks through its own make contact and the make contact of the ON relay.

The operation of relays RRLA and RRLB open the tip and ring leads of the originating register, disconnecting the originating register from switch 0. In addition, relays RRLA and RRLB operated open the locking path of relay DC and the latter relay releases. The release of relay DC opens the previously-described holding paths for relay L and relay L proceeds to release. This releases relay SR and relay SR, in turn, releases relay ON. With relay SR released, and relays RRLA and RRLB operated, ground is removed from conductor RHM0, removing the holding ground from hold magnet THM08, permitting the breakdown of the connection from the dial pulse register circuit to the calling subscriber line circuit. The release of relay ON opens the locking paths of relays RRLA and RRLB, and these relays release. Relay ON released also opens the locking path for the digit register relays and the operated ones release to remove the digit registration. In addition, relay ON released releases relay P2A and recloses conductors ONB0 and ONG0 to again indicate the availability of the register. Accordingly, the dial pulse register is again restored to the initial idle condition whereby it is available for another call.

*Register camp-on condition*

As described in the Abbott et al. patent, in the event that the called line is busy, the marker attempts to connect to the busy tone trunk. In accordance with the present invention, an intercept trunk circuit, FIG. 7, is substituted for the busy tone trunk circuit shown in FIG. 13 of the Abbott et al. patent. As further described in the Abbott et al. patent, to effect the connection to the busy tone trunk circuit, the operating path of relay S0, disclosed in FIG. 30 of the Abbott et al. patent, is extended to hold magnet THM07 of switch 0 to test for the busy condition of the trunk circuit. In the event, however, that ground is applied to hold magnet THM07, relay S0 cannot operate, and the marker returns a busy signal to the originating register by way of lead BY0, shown in FIG. 18 of the Abbott et al. patent.

Referring now to FIG. 6, the operating path of relay S0 is shown extending through a make contact of relay R0 to conductor BT0, relay R0 having been operated upon marker seizure, as previously described. Conductor BT0, in turn, extends to contacts KT2–2, FIG. 2. It is noted that conductor BT0 is connectable to conductor IT0 by way of the make contact of contacts KT2–2 and conductor IT0, in turn, extends to the break contact of contacts BB–8, FIG. 7, break contact BB–6, conductor HMO and thence to hold magnet THM07, FIG. 6. With relay K2T released, however, ground is extended to conductor BT0 whereby a simulated busy condition applicable to the intercept trunk circuit of FIG. 7 is applied to relay S0, precluding the operation of the relay. Accordingly, the trunk appears busy to the marker which therefore applies a busy ground signal to conductor BY0, which ground is passed through the winding of relay BYR and break contact KT–8 to negative battery, operating relay BYR which locks through make contact ON–7, make contact BYR–8 and break contact KT–2 or the break contact of contacts K–6 in shunt thereto.

Figure 2:
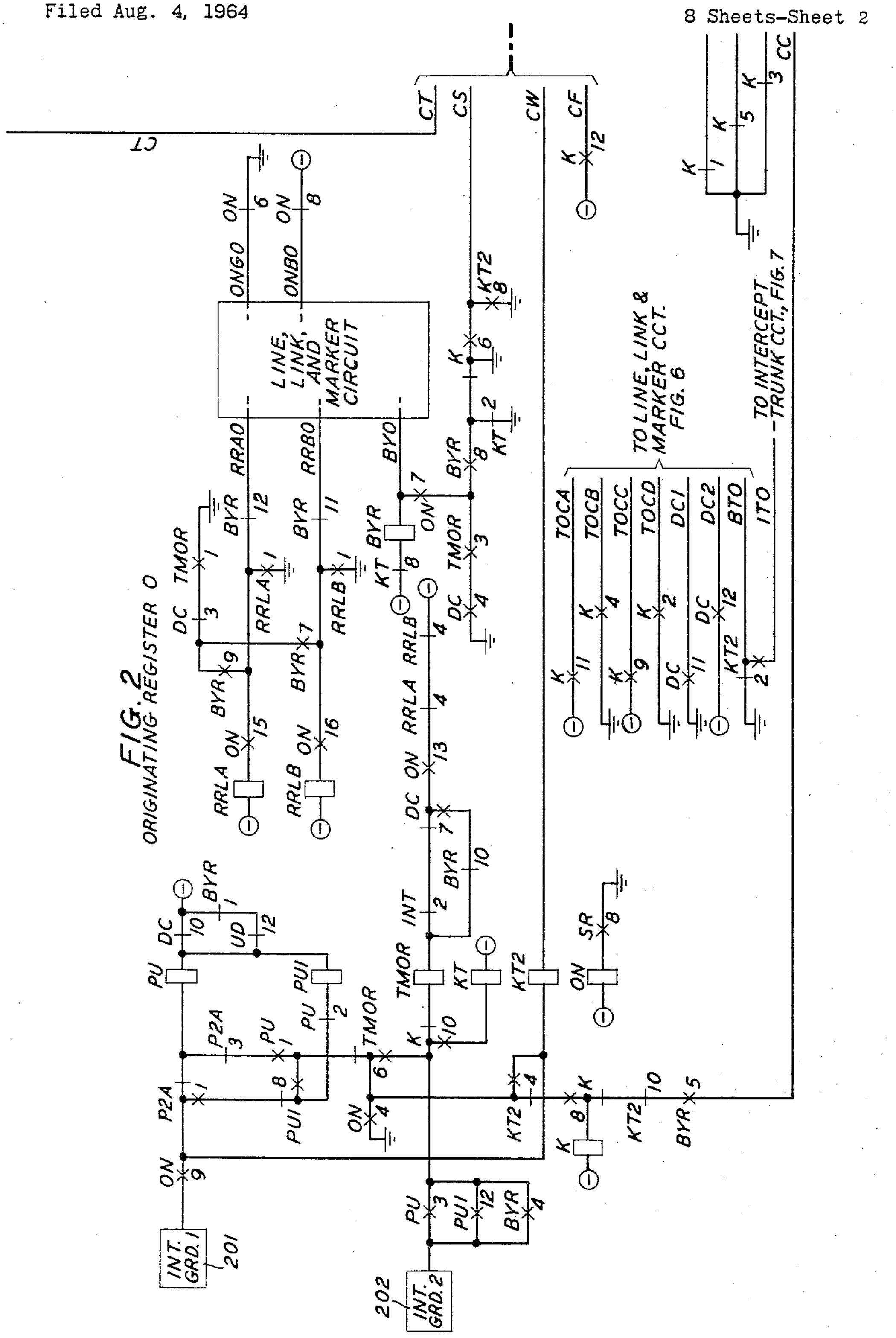

Relay BYR operated opens the previously-described locking path for relay DC, and this relay releases. The release of relay DC opens conductors DC1 and DC2 permitting the marker to be released, as previously described. In addition, with relay BYR operated, an operating path for relay K, FIG. 2, is completed through break contact KT2–10, make contact BYR–5 and conductor CC, which extends to FIG. 5, and then by way of conductor CC to the break contacts of the K relays in the other three-dial pulse registers. Accordingly, if at least one of the other dial pulse registers is not in the camp-on condition, the relay K therein is not operated, and ground is extended to conductor CC to operate relay K in dial pulse register 0, which relay locks by way of its own make contacts, the break contact of contacts KT2–4 and make contact ON–4.

With relay K operated, the dial pulse register is placed in the camp-on condition. In this condition the secondary winding of repeater coil TN is connected through the make contact of contacts BYR–14 and the make contact of contacts K–7 to conductor CT. Conductor CT, in turn, extends to FIG. 5, and thence through break contacts B–4 and A–9 to an oscillator supply 501 which may constitute a tone supply similar to dial tone 101. In addition, with relay K operated, negative battery is applied to conductor CF, FIG. 2, through make contact K–12, conductor CF, in turn, extending to relay B, FIG. 5, by way of break contact A–8. Relay B thus operates, completing an obvious operating path for relay A and opening the previously-described path extending dial tone to repeater coil TN. The operation of relay A opens the previously-described operating path for relay B and relay B released releases relay A. Accordingly, dial tone is reapplied to repeater coil TN and the operating and releasing cycle of relays A and B is again repeated. It is thus seen that during the camp-on period an interrupter dial tone is returned to the calling subscriber.

Returning now to the operation of relay K, one of the previously-described holding paths for relay BYR is opened and ground is applied through the make contact of contacts K–6 to conductor CS, which conductor extends to motor clutch relay MT, FIG. 5, of timer motor 502. This releases timer motor 502 which, after a predetermined interval of, for example, 3 minutes, closes contacts MT1. This 3-minute period defines the interval that the register may be maintained in the camp-on condition, as described hereinafter.

As described in detail in the Abbott et al. patent, the marker, upon determining the busy condition of the trunk circuit, initiates a time-out and release cycle, one step in the cycle comprising the release of relays TOLA and TOLB shown in FIG. 50 of the patent. Since the register in the camp-on condition requires the repeated reseizure of the marker, the time-out feature of the marker is halted while the camp-on condition persists to reduce marker holding time. Referring to FIG. 6, similarly identified relays TOLA and TOLB are shown including locking paths, which paths comprise conductors TOCA and TOCB associated with relay TOLA and conductors TOCC and TOCD associated with relay TOLB. Conductors TOCA and TOCC extend to make contacts of relay K, FIG. 2, and thence to negative battery while conductors TOCB and TOCD extend to ground via make contacts of relay K. Thus, with relay K operated during the camp-on condition, relays TOLA and TOLB are locked to hold up the time-out check cycle.

Returning now to relay K operated, a path is completed from interrupter ground source 202, FIG. 2, through make contact BYR–4 and the make contact of contacts K–10 to the winding of relay KT. Interrupter ground source 202, together with interrupter ground source 201, provide periodic ground pulses. The timing of the pulses involves a ground pulse from source 201 followed by a ground pulse from source 202 after an interval of approximately 7 seconds followed by a new cycle initiated by the ground pulse from source 201 and the subsequent pulse from the source 202 after the 7-second interval. Accordingly, upon the occurrence of the ground pulse from source 202, relay KT momentarily operates, and during the operation thereof opens the locking path for relay BYR, releasing the latter relay. With relay BYR released, the previously-described operating path for relay DC by way of make contact ON–3 is recompleted through contact 12 of relay KT which is shunting contact 11 of relay STR. With relay DC operated, conductors DC1 and DC2 are re-extended to ground and negative battery, respectively, whereby the marker is reseized to again attempt to recomplete the call to the called station.

If the called station is now idle and the marker completes the call, the marker applies ground to conductors RRA0 and RRB0, operating relays RRLA and RRLB, as previously described. This results in the sequential release of relays DC, L, SR, and ON, and the release of relay ON opens the previously-described locking path for relay K. Relay K released opens the previously-described operating path for clutch magnet MT of motor timer 502 permitting the motor timer to restore to its initial position. With relay ON released, relays RRLA and RRLB release, as previously described, thereby releasing the register and restoring it to the available condition for the next call.

In the event, however, that the called station is still busy, the marker again attempts to connect to the intercept trunk circuit and relay S0 finding the simulated ground applied through the break contact of contacts KT2–2 is precluded from operating. Accordingly, the marker again applies the busy ground pulse to conductor BY0 reoperating relay BYR. With relay BYR operated, the operating path of relay DC is reopened releasing relay DC. Accordingly, as previously described, the marker releases and the register is maintained in the camp-on condition.

After aproximately 7 seconds another ground pulse is provided by interrupter source 202, momentarily reoperating relay KT. This again releases relay BYR which, in turn, reoperates relay DC and the marker is again called to complete the call to the called station. This cycle of operation is thus repeated so long as the called station remains busy and is terminated if the called station becomes idle.

*Call interception*

After approximately 3 minutes of the camp-on operation, motor timer 502 closes cam contacts MT1. This extends negative battery to conductor CW which extends to the winding of relay KT2, FIG. 2, and thence through contacts ON–9 to interrupter ground source 201. Accordingly, the subsequent ground pulse from source 201 operates relay KT2 which locks by way of its own make contacts and contacts ON–4. With relay KT2 operated, the locking path for relay BYR through contacts KT2 is open, releasing relay BYR. Relay KT2 operated also applies ground to conductor CS by way of make contact KT2–8 to maintain clutch magnet MT energized. In addition, the locking path for relay K is opened by the operation of relay KT2 and relay K similarly releases. With relay BYR released, the previously-described operating path of relay DC is recompleted. The reoperation of relay DC again effects the reseizure of the marker circuit.

Assuming that the called station is still busy, the operating path of relay S0 is again extended to conductor BT0 to test the available condition of the intercept trunk circuit. Conductor BT0 is now extended through the make contact of contacts KT2–2, FIG. 2, to conductor IT0, and assuming that the intercept trunk circuit is, in fact, idle, conductor IT0 is connected through the break contact of contacts BB–8, FIG. 7, and thence through break contact AB–4 to negative battery and in shunt thereto through break contact BB–6 and conductor HM0 to the winding of hold magnet THM07. Accordingly, relay S0 finds negative battery on the winding of hold magnet THM07 permitting relay S0 to operate and thus operate select magnets SM00 and SM09 and hold magnet THM07 to connect the intercept trunk circuit to the calling subscriber line circuit as described in the Abbott et al. patent.

When the marker completes the call to the intercept trunk circuit and release ground pulse to the originating register operates relays RRLA and RRLB and these relays release the register relays and return the register to the available condition, as previously described. In addition, the release of relay ON opens the previously-described locking path for relay KT2 and the latter relay releases. With relay KT2 released, the energizing path of clutch magnet MT is opened, restoring motor timer 502 to its original position.

The connection of the calling subscriber line circuit to the intercept trunk circuit now completes an energizing path for relay AB, FIG. 7, across the tip and ring leads by way of the calling subscriber line circuit. This results in the operation of relay AB which, in turn, completes an obvious operating path for relay BB. With relays AB and BB operated, ground is applied to the sleeve lead S of the intercept trunk circuit to indicate its busy condition. In addition, relay BB operated applies ground by way of the make contact of contacts BB–8 to conductor IT0 whereby ground will be returned to relay S0 indicating the busy condition of the intercept trunk circuit. Relays AB and BB operated also extend ground to conductor LK0, and conductor LK0, in turn, is connected to hold magnet THM07, maintaining the hold magnet energized to hold the connection of the intercept trunk circuit to the subscriber line circuit.

The operation of relay AB extends ring tone supply through make contact AB–2, the upper winding as viewed in FIG. 7 of relay TP, the break contact of contacts TP–9, the ring lead of data set 702 and thence to the tip lead and the break contact of contacts TP–7 back to ring tone supply 701. As disclosed in the above-identified Doktor et al. patent, the application of the ringing signal to the data set places the data set in the off-hook condition, whereby the set initiates the "hand shaking" sequence. In addition, the ringing signal operates relay TP which prepares a locking path through its lower winding and make contacts TP–12 and BB–2. With relay TP operated, the tip and ring leads of data set 702 are extended through the windings of relay D and the latter relay operates to complete a supplementary locking path for relay TP by way of make contact D–10. In addition, the tip and ring leads of data set 702 are connected to the tip and ring leads of the intercept trunk circuit by the operation of relay TP, whereby data set 702 is connected to the calling subscriber line circuit. Data set 702 thus is enabled to initiate the "hand shaking" sequence with the calling subscriber data set and at the termination thereof to receive the data message from the calling subscriber.

At the termination of the data message, the calling subscriber disconnects, opening the operating path for relay AB. Relay AB released, releases, in turn, relay BB. In addition, the disconnect sequence received from the calling subscriber returns data set 702 to the on-hook condition, as described in the above-identified T. L. Doktor et al. patent. Accordingly, the energizing path for relay D is opened and with relays D and BB released, relay TP releases. This restores the intercept trunk circuit to the initial idle condition and with relays AB and BB released, removes the holding ground from hold magnet THM07, permitting the release of the hold magnet and the restoration of switch 0.

*Miscellaneous busy conditions and irregular operation*

It has been previously described that the camp-on condition of the register occurs in the event that one or more of the other dial pulse registers is not in the camp-on condition. Assuming, however, that all of the other registers are in the camp-on condition, and corresponding K relays are operated, the operating path of the K relay of originating register 0 cannot find a path to ground. Accordingly, relay K remains released and with relay BYR operated, relay DC is released, releasing the marker and busy tone from source 103, FIG. 1, is applied via the break contact of contacts K–7 and the make contact of contacts BYR–14 across the secondary winding of repeater coil TN and thence back to the calling subscriber. The calling subscriber is thus advised to disconnect, resulting in the release of relay L and the subsequent release of relays SR and ON, as previously described. With relay ON released, relay BYR releases. The register is thus returned to the initial idle condition.

In the event that the subscriber does not disconnect in response to the busy tone, the subsequent ground pulse from interrupter ground source 202 is passed through make contact BYR–4, the break contact of contacts K–10 through the winding of relay TMOR, break contact INT–2, break contact of contacts DC–7, make contact ON–13 and break contacts RRLA–4 and RRLB–4 to negative battery, operating relay TMOR which locks by way of its own make contact and make contact ON–4.

With relay TMOR operated, operating paths for relays RRLA and RRLB are completed by way of make contacts of relays BYR and TMOR and break contacts of relay DC. This results in the release of the register, as previously described, relays BYR and TMOR also being released by the consequent release of relay ON.

It has previously been described that after a three minute camp-on period the calling subscriber line is connected to the intercept trunk circuit if the called subscriber is busy. In the event, however, that the intercept trunk circuit is servicing a call from another subscriber at the termination of the camp-on condition, the previously-described operation of relay KT2, together with the operation of relay BB in the intercept trunk circuit, extends ground through the make contact of contacts BB–8, FIG. 7, through conductor IT0, the make contact of contacts KT2–2, FIG. 2, conductor BT0, the make contact relay R0, FIG. 6, to the winding of relay S0 whereby this relay cannot operate due to the busy condtion of the intercept trunk circuit. Accordingly, the marker returns busy ground on conductor BY0 which extends to the winding of relay BYR, operating the relay which locks, as previously described. With relay BYR operated and relay K released, the previously-described path for applying busy tone from source 103 to the secondary winding of repeater coil TM is completed, returning the busy tone to the calling subscriber. In addition, relay BYR operated opens the previously-described locking path for relay DC and this relay releases.

In response to the busy tone, the calling subscriber normally disconnects, thereby releasing relay L and relay L, in turn, releases relays SR and ON. With relay ON released, relays KT2 and BR release and clutch magnet MT is de-energized, thus returning the register to the initial available condition.

In the event that the calling subscriber does not disconnect, the generation of the next ground pulse from interrupter ground source 202 is applied by way of make contact BYR–4, break contact of contacts K–10, the winding of relay TMOR, break contact INT–2, the break contact of contacts DC–7, make contact ON–13 and break contacts RRLA–4 and RRLB–4 to negative battery, operating relay TMOR which locks, as previously described. With relay TMOR operated, energizing paths for relays RRLA and RRLB are completed by way of the make contacts of relays ON and BYR, break contact DC–3 and make contact TMOR–1, whereby these two relays operate and lock as previously described. The operation of these relays opens the previously-described locking path for relays TMOR and DC and opens the tip and ring leads of the originating register trunk circuit, as previously described. Accordingly, relay L releases, releasing, in turn, relays SR and ON. Relay ON released releases relays RRLA and RRLB and KT2 and clutch magnet MT, in turn, is de-energized, thus restoring the register to the initial available condition.

The register is also arranged to detect a partial dial time-out, wherein the calling subscriber fails to complete the transmission of the called subscriber's digits within a predetermined interval of time. In this event, the marker is called in, and the call is transferred to an attendant's trunk circuit, which trunk circuit is described in detail in the Abbott et al. patent.

If the calling subscriber has not sent the first digit, relay P2A is released, as previously described, and upon the occurrence of a ground pulse from interrupter ground source 201, relay PU is energized over a path comprising make contact ON–9, the break contact of contacts P2A–1, the winding of relay PU, break contact DC–10, or break contacts UD–12 and BYR–1 in shunt thereto, to negative battery, operating relay PU which locks by way of break contact P2A–3, make contact PU–1, the break contact of contacts TMOR–6 and make contact ON–4 to ground. It is noted that in the event that the first digit is received after the operation of relay PU, relay P2A operates, releasing relay PU and thereby recycling the time-out period. Further, in the event that the calling subscriber fails to complete dialing after having sent at least one digit, the ground pulse from interrupter ground source 201 is passed by way of the make contact of contacts B2A–1, the break contact of contacts PU1–8, break contact PU–2, the winding of relay PU1 and the break contact relay DC or the break contact relays UD and BYR in shunt thereto, operating relay PU1 which locks by way of the contacts of relays TMOR and ON. It is here noted that the subsequent reception of the units digit and the consequent operation of relay DC together with the operation of relay UD opens the energizing path of relay PU1 and this relay releases to recycle the time-out circuit.

Assuming now that either relay PU or PU1 is operated, and the time-out circuit is not recycled, the next subsequent ground pulse from interrupter ground pulse 202 is passed through make contact PU–3 or make contact PU1–12 in shunt thereto, and thence through the previously-described operating path of relay TMOR. With relay TMOR operated, the previously-described locking path of relays PU and PU1 is open and the operated one of these relays is released. In addition, relay TMOR operated completes an obvious operating path for relay INT, FIG. 4, and relay INT locks through a make contact of relay ON. With relay INT operated, the energizing path for relay TMOR is open and this relay releases. The release of relay TMOR now completes an energizing path for relay DC by way of make contact INT–3, break contact TMOR–5, the break contact of contacts BYR–6, the winding of relay DC and the break contact of relays RRLA and RRLB to negative battery, operating relay DC, whereby the services of the marker are requested, as previously described. In addition, with relay INT operated, ground is applied to terminal stamping H0 by way of make contact ON–11 and the make contact of contacts INT–11. This ground, as described in detail in the Abbott et al. patent, registers a zero digit in the hundredths connector circuit of the marker to call in the attendant's trunk circuit to provide for operator action. In addition, the marker, upon the completion of a call, returns ground over conductors RRA0 and RRB0 to operate relays RRLA and RRLB whereby the register is restored to the initial available condition, as previously described.

Although a specific embodiment of the invention has been shown and described, it will be understood that various modifications may be made without departing from the spirit of this invention, and within the scope of the appended claims.

What is claimed is:

1. A camp-on and intercept circuit for a switching office which interconnects subscriber lines, said office including a plurality of digit registers and a common control marker seizable by any one of said registers for connecting calling lines to called lines and signaling said register when said called line is busy, said camp-on and intercept circuit comprising means in said register responsive to said busy line signal for reseizing said marker, a supervisory trunk, and further means responsive to said busy line signal and effective after a plurality of said reseizures for connecting said calling line to said supervisory trunk.

2. A camp-on and intercept circuit in accordance with claim 1 wherein said supervisory trunk includes a data set for receiving data signals from a connected subscriber line.

3. A camp-on and intercept circuit in accordance with claim 1, further including a camp-on signal transmitter and means in said register responsive to said reseizing means for applying the output of said transmitter to said calling line.

4. A camp-on and intercept circuit in accordance with claim 1, further including means for normally applying a simulated busy condition to said supervisory trunk and means responsive to said further means after said plurality of reseizures for receiving said simulated busy condition.

5. A camp-on and intercept circuit for a switching office which connects data subscriber lines, said office including a plurality of digit registers, a supervisory trunk, and a common control marker seizable by any one of said registers for connecting calling lines to called lines, testing said supervisory trunk when said called line is busy, and signaling said register when said supervisory trunk is busy, said camp-on and intercept circuit comprising means for normally applying a busy condition to said supervisory trunk, means in said register responsive to said busy trunk signal for reseizing said marker, and further means responsive to said busy trunk signal and effective after a plurality of said reseizures for removing the busy condition applied to said trunk.

6. A camp-on and intercept circuit in accordance with claim 5 wherein said supervisory trunk includes a data set for receiving data signals.

7. A camp-on and intercept circuit in accordance with claim 5 wherein said reseizing means includes means responsive to said busy trunk signal for operating said reseizing means after a delay interval.

8. A camp-on and intercept circuit in accordance with claim 7 wherein said further means includes timing means responsive to said busy trunk signal for operating said further means after an interval having a duration of at least a plurality of said delay intervals.

9. A camp-on and intercept circuit in accordance with claim 5 further including means for precluding the operation of said reseizing means in response to the operation of reseizing means in others of said registers.

References Cited

UNITED STATES PATENTS

| | | | |
|---|---|---|---|
| 3,301,957 | 1/1967 | Germond et al. | 179—2 |
| 3,308,245 | 3/1967 | Levine | 179—27 |

FOREIGN PATENTS

| | | |
|---|---|---|
| 867,343 | 5/1961 | Great Britain. |

KATHLEEN H. CLAFFY, *Primary Examiner.*

L. A. WRIGHT, *Assistant Examiner.*